(12) United States Patent
Davis et al.

(10) Patent No.: US 10,662,811 B2
(45) Date of Patent: May 26, 2020

(54) FLUID DAMPING STRUCTURE RING AND METHOD OF FLUID DAMPING

(71) Applicant: United Technologies Corporation, Farmington, CT (US)

(72) Inventors: Todd A. Davis, Tolland, CT (US); Denman H. James, West Hartford, CT (US); Daniel L. Gysling, South Glastonbury, CT (US); Joseph D. Walker, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 367 days.

(21) Appl. No.: 15/592,790

(22) Filed: May 11, 2017

(65) Prior Publication Data

US 2018/0328225 A1     Nov. 15, 2018

(51) Int. Cl.
*F01D 25/16* (2006.01)
*F16C 27/04* (2006.01)
(Continued)

(52) U.S. Cl.
CPC .......... *F01D 25/164* (2013.01); *F01D 25/20* (2013.01); *F02C 7/06* (2013.01); *F16C 27/045* (2013.01);
(Continued)

(58) Field of Classification Search
CPC ........ F16C 27/02; F16C 27/045; F01D 25/20; F01D 25/18; F16F 15/0237
(Continued)

(56) References Cited

U.S. PATENT DOCUMENTS

| | | | |
|---|---|---|---|
| 1,329,559 A | 2/1920 | Tesla | |
| 2,729,518 A * | 1/1956 | O'Connor | F16C 27/045 384/99 |

(Continued)

FOREIGN PATENT DOCUMENTS

| | | |
|---|---|---|
| GB | 2033024 A | 5/1980 |
| JP | H1162953 A | 3/1999 |

OTHER PUBLICATIONS

EP search report for EP18171660.6 dated Jul. 6, 2018.

*Primary Examiner* — Kenneth Bomberg
*Assistant Examiner* — Hakeem M Abdellaoui
(74) *Attorney, Agent, or Firm* — Getz Balich LLC

(57) ABSTRACT

A fluid damping structure is provided that includes a damper ring. The damper ring includes an annular body a plurality of fluid check valves, and at least one fluid stop. The annular body extends circumferentially around an axial centerline, and is defined by a first end surface, a second end surface, an outer radial surface, and an inner radial surface. The outer radial surface and the inner radial surface extend axially from the first end surface toward the second end surface. The body includes one or more check valve passages. Each check valve passage extends axially from an open end disposed at the first end surface inwardly toward the second end surface, and is disposed between the inner radial surface and the outer radial surface. An inlet aperture extends between each check valve passage and the outer radial surface, and an outlet aperture extends between each check valve passage and the inner radial surface. Each fluid check valve is disposed in a check valve passage. The at least one fluid stop is configured to prevent fluid exit from the open end of each check valve passage.

20 Claims, 5 Drawing Sheets

(51) Int. Cl.
  *F16F 15/023* (2006.01)
  *F01D 25/20* (2006.01)
  *F02C 7/06* (2006.01)
  *F16K 15/00* (2006.01)

(52) U.S. Cl.
  CPC .......... *F16F 15/0237* (2013.01); *F16K 15/00* (2013.01); *F05D 2220/32* (2013.01); *F05D 2240/50* (2013.01); *F05D 2240/53* (2013.01); *F05D 2260/96* (2013.01); *F05D 2260/98* (2013.01); *F16C 2360/23* (2013.01)

(58) Field of Classification Search
  USPC ....... 384/99, 535, 16, 316, 313, 900, 184 R, 384/187.1, 199; 464/180
  See application file for complete search history.

(56) References Cited

U.S. PATENT DOCUMENTS

| | | | |
|---|---|---|---|
| 2,992,842 A * | 7/1961 | Shevchenko | F01D 11/003 277/306 |
| 3,452,839 A * | 7/1969 | Swearingen | F04D 29/061 184/6 |
| 4,214,796 A * | 7/1980 | Monzel | F01D 25/164 384/202 |
| 4,289,360 A * | 9/1981 | Zirin | F16F 15/0237 384/462 |
| 4,443,161 A * | 4/1984 | Masuda | F04C 15/06 417/304 |
| 4,527,911 A * | 7/1985 | Davis | F01D 25/18 384/471 |
| 4,669,893 A | 6/1987 | Chalaire et al. | |
| 4,775,248 A | 10/1988 | Barbic et al. | |
| 4,971,457 A | 11/1990 | Carlson | |
| 4,971,458 A | 11/1990 | Carlson | |
| 4,983,051 A * | 1/1991 | Hibner | F01D 25/164 184/6.11 |
| 5,042,616 A * | 8/1991 | McHugh | F01D 25/18 184/6.11 |
| 5,046,306 A * | 9/1991 | Borre, Jr. | F01D 25/18 184/6.11 |
| 5,110,257 A * | 5/1992 | Hibner | F01D 25/164 415/119 |
| 5,149,206 A | 9/1992 | Bobo | |
| 5,169,241 A | 12/1992 | Singh | |
| 5,392,858 A * | 2/1995 | Peters | E21B 7/061 166/298 |
| 7,625,121 B2 * | 12/2009 | Pettinato | F16C 17/03 384/117 |
| 8,201,389 B2 * | 6/2012 | Eleftheriou | F01D 25/18 60/39.08 |
| 8,511,055 B2 * | 8/2013 | DiBenedetto | F01D 25/164 60/39.08 |
| 9,599,152 B2 * | 3/2017 | Freeman | F16F 15/0237 |
| 10,156,158 B2 * | 12/2018 | Davis | F01D 25/125 |
| 10,228,023 B2 * | 3/2019 | Clark | F16C 33/6677 |
| 2007/0157596 A1 * | 7/2007 | Moniz | F01D 25/164 60/39.162 |
| 2011/0284103 A1 * | 11/2011 | Davis | F01D 5/141 137/511 |
| 2017/0306795 A1 * | 10/2017 | Davis | F01D 25/125 |
| 2018/0328225 A1 * | 11/2018 | Davis | F02C 7/06 |
| 2018/0347455 A1 * | 12/2018 | Noda | F02B 39/14 |
| 2018/0363501 A1 * | 12/2018 | Noda | F01D 25/186 |

* cited by examiner

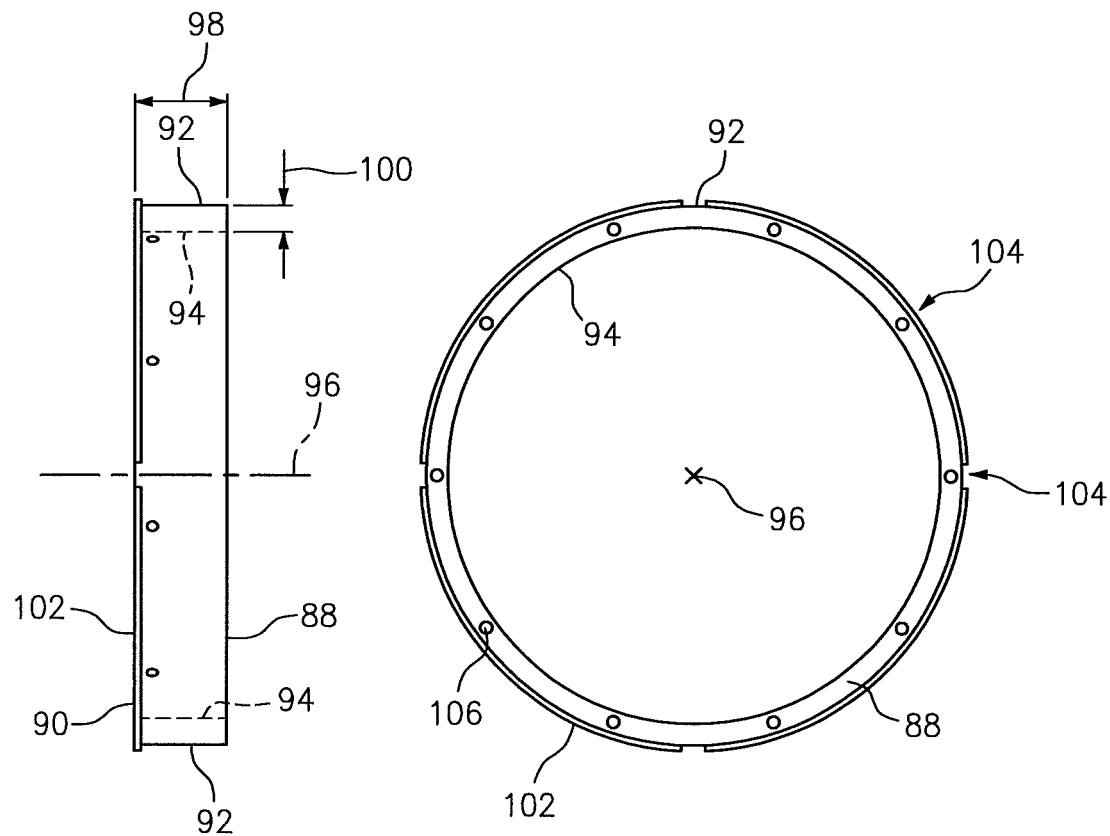
*FIG. 5A*  *FIG. 5B*
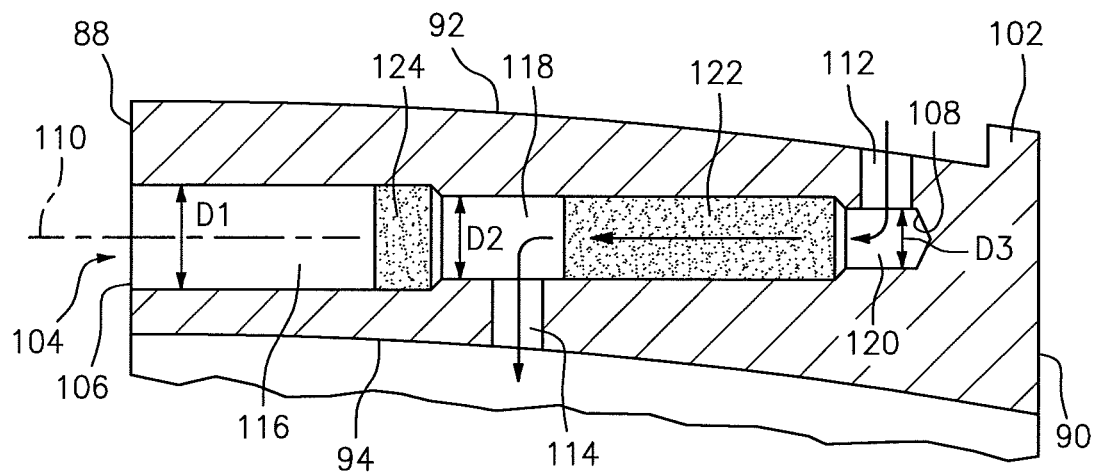
*FIG. 6*

FLUID DAMPING STRUCTURE RING AND METHOD OF FLUID DAMPING

BACKGROUND OF THE INVENTION

1. Technical Field

This disclosure relates generally to a gas turbine engine lubrication systems and methods and more particularly to gas turbine engine lubrication systems and methods for use with fluid damping structures.

2. Background Information

Gas turbine engines are often configured to include a fan section, a low pressure compressor section, a high pressure compressor section, a combustor section, a low pressure turbine section, a high pressure turbine section, a low speed spool, and a high speed spool. The fan section may be configured to drive air along a bypass flow path, while the compressor section drives air along a core flow path for compression and communication into the combustor section then expansion through the turbine section. The low speed spool and the high speed spool are mounted for rotation about an engine central longitudinal axis relative to an engine static structure via several bearing systems. The low speed spool generally interconnects the fan section, the low pressure compressor section and the low pressure turbine section. The high speed spool generally interconnects the high pressure compressor section and the high pressure turbine section. The combustor section is disposed between the high pressure compressor section and the high pressure turbine section. The high speed spool may be described as normally rotatable about an axis of rotation.

Under normal operating conditions, a shaft section of a spool (e.g., a shaft section of the high speed spool) will rotate without significant vibration. Under certain operating conditions, however, a spool shaft section may be subject to cyclical, orbital motion (i.e., motion that includes a displacement of the axis of rotation—referred to hereinafter as an "imbalanced condition") that can lead to undesirable vibration. Such cyclical, orbital motion may be the product of temporary thermal bowing of the spool shaft section as a result of a thermal gradient within the engine. Once the thermal gradient sufficiently dissipates, the imbalanced condition dissipates and the spool shaft section restores itself to normal operating condition; e.g., rotation about the axis of rotation.

As will be appreciated by those skilled in the art, the existence of an imbalanced condition in a rotor shaft may result in a greatly increased demand on the bearing components to restrain the movement of the rotor shaft and to transfer the lateral forces induced by the imbalanced condition into the machinery mounting structure.

One method of reducing the aforesaid lateral forces and attendant stresses on the bearings is the use of a fluid damping structure (sometimes referred to as "fluid squeeze damper"). Fluid damper structures are known in the prior art, but many suffer from performance issues and/or require lubricant fluid boost pump mechanisms.

SUMMARY OF THE DISCLOSURE

According to an aspect of the present disclosure, a damper ring is provided. The damper ring includes an annular body, at least one check valve, and at least one fluid stop. The annular body extends circumferentially around an axial centerline. The body is defined by a first end surface, a second end surface, an outer radial surface, and an inner radial surface. The outer radial surface and the inner radial surface extend axially from the first end surface toward the second end surface. The annular body includes one or more check valve passages. Each passage extends axially from an open end disposed at the first end surface inwardly toward the second end surface, and is disposed between the inner radial surface and the outer radial surface. An inlet aperture extends between each check valve passage and the outer radial surface providing fluid communication there between. An outlet aperture extends between each check valve passage and the inner radial surface providing fluid communication there between. A fluid check valve is disposed in each check valve passage. The fluid check valve is configured to permit fluid flow in a first direction through the check valve passage from the inlet aperture to the outlet aperture and to substantially prevent fluid flow in a second direction opposite the first direction. The at least one fluid stop is configured to prevent fluid exit from the open end of each check valve passage.

According to any embodiment or aspect of the present disclosure, the one or more check valve passages may include at least ten check valve passages spaced substantially uniformly in a circumferential direction around the annular body.

According to any embodiment or aspect of the present disclosure, each check valve passage may extend from the open end to a terminal end disposed within the body.

According to any embodiment or aspect of the present disclosure, each check valve passage may include a first portion having a diameter D1, a second portion having a diameter D2, and a third portion having a diameter D3, wherein D1>D2>D3, and the inlet aperture may extend between the third portion and the outer radial surface, and the outlet aperture may extend between the second portion and the inner radial surface, and the check valve is disposed in the second portion.

According to any embodiment or aspect of the present disclosure, the at least one fluid stop may include a plug disposed in each check valve passage.

According to any embodiment or aspect of the present disclosure, at least one of the one or more check valve passages may have a centerline that extends in a direction that is parallel to the axial centerline of the damper ring, and the check valve passage centerline and the axial centerline are co-planar.

According to any embodiment or aspect of the present disclosure, at least one of the one or more check valve passages may have a centerline that extends in a direction that is skewed by an angle α to the axial centerline of the damper ring, and the check valve passage centerline and the axial centerline are non-co-planar.

According to any embodiment or aspect of the present disclosure, the fluid check valve may be a fluid-impedance check valve with no moving components.

According to an aspect of the present disclosure, a gas turbine engine is provided. The gas turbine engine includes at least one rotor shaft, at least one bearing compartment, and a lubrication system. The at least one rotor shaft extends between a compressor section and a turbine section. The at least one bearing compartment is disposed to support the rotor shaft. The bearing compartment has at least one bearing and at least one fluid damping structure. The fluid damping structure includes a damping chamber defined in part by a damper ring. The damper ring includes an annular body, at least one fluid check valve, and at least one fluid stop. The annular body extends circumferentially around an axial centerline. The body is defined by a first end surface, a second end surface, an outer radial surface, and an inner radial surface. The outer radial surface and the inner radial surface extend axially from the first end surface toward the second end surface. The annular body includes one or more check valve passages. Each passage extends axially from an open end disposed at the first end surface inwardly toward the second end surface, and is disposed between the inner radial surface and the outer radial surface. An inlet aperture extends between each check valve passage and the outer radial surface providing fluid communication there between. An outlet aperture extends between each check valve passage and the inner radial surface providing fluid communication there between. A fluid check valve is disposed in each check valve passage. The fluid check valve is configured to permit fluid flow in a first direction through the check valve passage from the inlet aperture to the outlet aperture and to substantially prevent fluid flow in a second direction opposite the first direction. The at least one fluid stop is configured to prevent fluid exit from the open end of each check valve passage. The lubrication system includes a main supply pump powered by the rotor shaft, and is configured to provide a flow of fluid lubricant to the damping chamber through the damper ring.

According to any embodiment or aspect of the present disclosure, each check valve passage may extend from the open end to a terminal end disposed within the body.

According to any embodiment or aspect of the present disclosure, the at least one fluid stop may include a plug disposed in each check valve passage.

According to any embodiment or aspect of the present disclosure, at least one of the one or more check valve passages may have a centerline that extends in a direction that is parallel to the axial centerline of the damper ring, and the check valve passage centerline and the axial centerline are co-planar.

According to any embodiment or aspect of the present disclosure, at least one of the one or more check valve passages may have a centerline that extends in a direction that is skewed by an angle α to the axial centerline of the damper ring, and the check valve passage centerline and the axial centerline are non-co-planar.

According to any embodiment or aspect of the present disclosure, the fluid check valve may be a fluid-impedance check valve with no moving components.

According to an aspect of the present disclosure, a method of providing a damping fluid within a fluid damping structure disposed within a gas turbine engine, wherein the gas turbine engine includes a rotor shaft, is provided. The method includes: a) operating a main supply pump of the gas turbine engine to produce a damping fluid flow to a fluid damping structure, which fluid damping structure includes damper ring that defines a portion of a damping chamber, the damper ring as defined above; and b) providing the damping fluid flow into the damping chamber through the one or more check valve passages disposed within the damper ring and the check valve disposed in each respective check valve passage.

According to any embodiment or aspect of the present disclosure, each check valve passage may extend from the open end to a terminal end disposed within the body.

According to any embodiment or aspect of the present disclosure, at least one of the one or more check valve passages may have a centerline that extends in a direction that is parallel to the axial centerline of the damper ring, and the check valve passage centerline and the axial centerline are co-planar.

According to any embodiment or aspect of the present disclosure, at least one of the one or more check valve passages may have a centerline that extends in a direction that is skewed by an angle α to the axial centerline of the damper ring, and the check valve passage centerline and the axial centerline are non-co-planar.

According to any embodiment or aspect of the present disclosure, the fluid check valve may be a fluid-impedance check valve with no moving components.

The foregoing features and the operation of the present disclosure will become more apparent in light of the following description and the accompanying drawings.

BRIEF DESCRIPTION OF THE DRAWINGS

FIG. 5A is a side view of the damper ring embodiment shown in FIG. 4.

FIG. 5B is a planar view of the damper ring embodiment shown in FIG. 4.

FIG. 6 is a diagrammatic sectional partial view of a damper ring embodiment.

DETAILED DESCRIPTION

Figure 1:
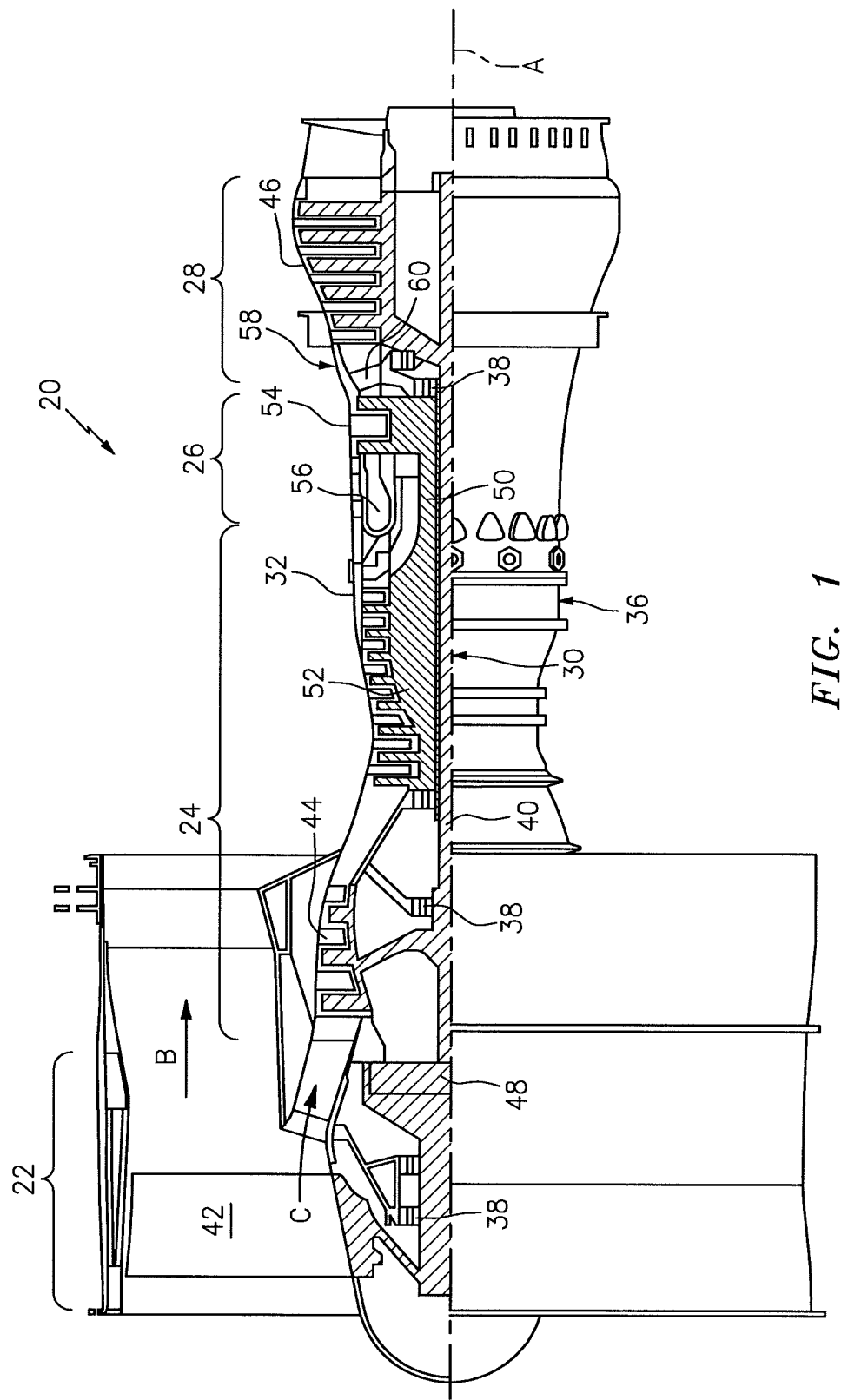
FIG. 1 is a diagrammatic partially sectioned view of a gas turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Referring now to the FIGURES, to facilitate the description of the present disclosure a two-spool turbofan type gas turbine engine 20 is shown (e.g., see. FIG. 1). This exemplary embodiment of a gas turbine engine includes a fan section 22, a compressor section 24, a combustor section 26, a turbine section 28, and a main lubrication system in fluid communication with one or more fluid damping structures. The fan section 22 drives air along a bypass flow path B in a bypass duct, while the compressor section 24 drives air along a core flow path C for compression and communication into the combustor section 26 then expansion through the turbine section 28. Although a two-spool turbofan gas turbine engine is described herein to facilitate the description of the present disclosure, it should be understood that the present disclosure is not limited to use with two-spool turbofans as the teachings may be applied to other types of turbine engines; e.g., three-spool architectures.

The exemplary engine 20 shown in FIG. 1 includes a low speed spool 30 and a high speed spool 32 mounted for rotation about an engine central longitudinal axis A relative to an engine static structure 36 via several bearing systems 38. It should be understood that the location, number, and characteristics of bearing systems 38 may vary to suit the particular application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. The inner shaft 40 and the outer shaft 50 are concentric and rotate via bearing systems 38 about the engine central longitudinal axis "A" which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The gas turbine engine 20 diagrammatically depicted in FIG. 1 is one example of a high-bypass geared aircraft engine. In other examples, the gas turbine engine 20 may have a bypass ratio that is greater than about six (6), with an example embodiment being greater than about ten (10), the geared architecture 48 may be an epicyclic gear train, such as a planetary gear system or other gear system, with a gear reduction ratio of greater than about 2.3 and the low pressure turbine 46 may have a pressure ratio that is greater than about five. In one disclosed embodiment, the gas turbine engine bypass ratio is greater than about ten (10:1), the fan diameter is significantly larger than that of the low pressure compressor 44, and the low pressure turbine 46 has a pressure ratio that is greater than about five 5:1. The low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one or more embodiments of a geared architecture engine and that the present disclosure is applicable to other gas turbine engines including direct drive turbofans.

Figure 2:
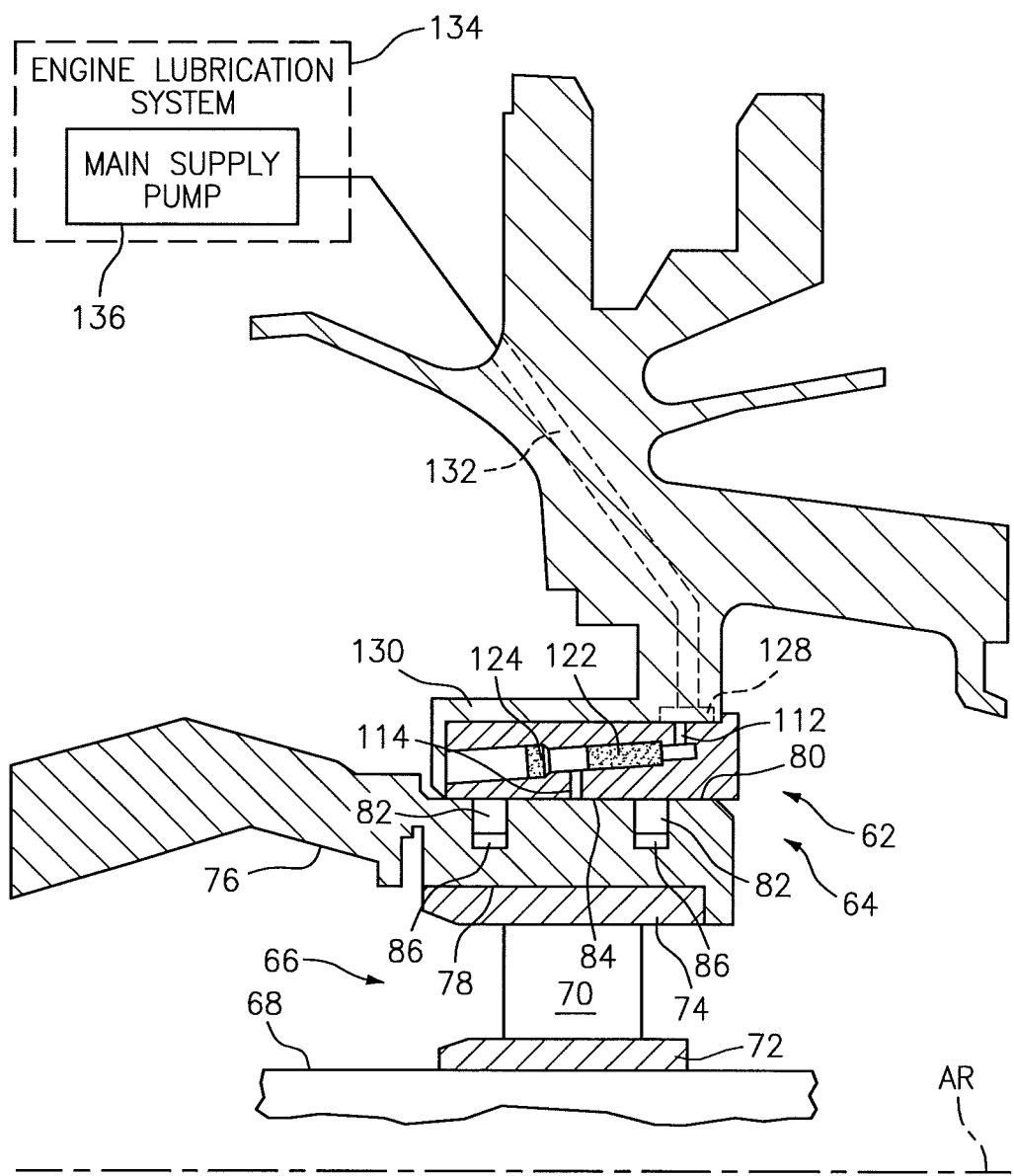
FIG. 2 is a diagrammatic cross-sectional view of a portion of a gas turbine engine, showing a fluid damping structure.

Referring now to FIG. 2, embodiments of the present disclosure include a damper ring 62, a fluid damping structure 64, and a method for providing a damping fluid (e.g., a lubricant fluid used within the engine 20) to a fluid damping structure 64. Embodiments of the present damper ring 62 can be used in a variety of different fluid damping structure 64 configurations, and the present disclosure is not therefore limited to a particular damper ring 62 configuration, or a particular fluid damping structure 64. The fluid damping structure 64 is typically, but not necessarily, disposed radially adjacent a bearing 66 for a rotor shaft 68 of a gas turbine engine 20; e.g., a high speed spool of a turbofan type gas turbine engine.

The engine rotor shaft 68 is rotatable about an axis "AR" within a range of rotational velocities. The bearing 66 includes a plurality of rolling elements 70 disposed between an inner race 72 and an outer race 74. Typically, the inner race 72 is engaged with the rotor shaft 68, and rotates with the rotor shaft 68 during operation of the gas turbine engine 20. The outer race 74 is non-rotationally mounted to a bearing support 76. The rolling elements 70 are configured for rotational movement between the inner and outer bearing races 72, 74. The present disclosure is not limited to use with any particular type of bearing or any particular bearing support configuration unless otherwise provided below.

FIG. 2 shows an embodiment wherein the outer race of the bearing 66 is engaged with a static bearing support 76. The term "static" as used here indicates that the bearing support 76 is non-rotational. The bearing support 76 may be configured to move (e.g., radial deflection) in response to a displacement of the axis of rotation of the rotor shaft 68 with which the bearing 66 is associated. The bearing support 76 includes a circumferentially extending first radial surface 78 and second radial surface 80. In FIG. 2, the first radial surface 78 and the second radial surface 80 are on opposing sides of a portion of the bearing support 76, but this is not required. The first radial surface 78 is engaged with the outer bearing race 74. The second radial surface 80 defines a part of the fluid damping structure 64. In alternative embodiments, the bearing support 76 may be engaged with, but independent of, the fluid damping structure 64; e.g., the bearing support 76 may not define a part of the fluid damping structure 64.

The fluid damping structure 64 is further defined by the damper ring 62 and a pair of ring seals 82. Collectively, the damper ring 62, the ring seals 82, and the bearing support 76 (or other element if the damper support 76 is independent of the fluid damping structure 64) define a damping chamber 84 configured to receive a damping fluid. The ring seals 82 are spaced axially apart from one another and extend circumferentially about the axis of the rotor shaft 68. Each ring seal 82 extends radially between and engages the bearing support 76 and the damper ring 62 to define a portion of the damping chamber 84. In the embodiment shown in FIG. 2, the bearing support 76 includes a pair of annular slots 86 disposed within the second radial surface 80, each configured to receive a portion of a ring seal 82. The present disclosure is not limited to any particular structure for locating and/or retaining the ring seals 82; e.g., the damper ring 62 may include annual slots for locating and/or retaining the ring seals 82. The ring seals 82 may be configured to create a fluid tight between the bearing support 76 and the damper ring 62, or to pet nit some amount of fluid leakage from the fluid damping structure 64. In some embodiments, the fluid damping structure 64 may include one or more fluid vents (not shown) that permit fluid to exit the fluid damping structure 64.

Referring now to FIGS. 3-6, the damper ring 62 has a first end surface 88, a second end surface 90, an outer radial surface 92, and an inner radial surface 94 that collectively define an annular ring type configuration that extends circumferentially around an axial centerline 96. The axial length 98 of the damper ring 62 may be defined at the distance between the first and second end surfaces 88, 90 at a given radial distance from the axial centerline 96 (e.g., See FIG. 5A). The inner radial surface 94 is disposed radially inside of the outer radial surface 92 relative to the axial centerline 96. The radial thickness 100 of the damper ring 62 may be defined as the distance between the inner and outer radial surfaces 94, 92 at a given position on the axial centerline 96. The thickness 100 of the damper ring 62 may be uniform along substantially the entire axial length 98 of the damper ring 62, but that is not required. The damper ring 62 embodiment shown in FIG. 5B, for example, has a uniform thickness 100 along substantially the entire axial length 98 of the ring 62 but also includes a lip 102 disposed adjacent the second end surface 90. Hence, this embodiment of the damper ring 62 does not have a uniform thickness 100 along its entire axial length 98.

The damper ring 62 includes one or more check valve passages 104 extending within the body of the ring 62. In the embodiments shown in FIGS. 3-6, each check valve passage 104 extends axially from the first end surface 88 inwardly toward the second end surface 90, between the inner and outer radial surfaces 94, 92, but does not extend entirely between the first and second end surfaces 88, 90. In these embodiments, each check valve passage 104 may be described as having a first open end 106 disposed at the first end surface 88 and a second terminal end 108 (e.g., see FIG. 6). In alternative embodiments, a check valve passage 104 may extend entirely between the first and second end surfaces 88, 90 (e.g., see FIG. 7).

Figure 3:
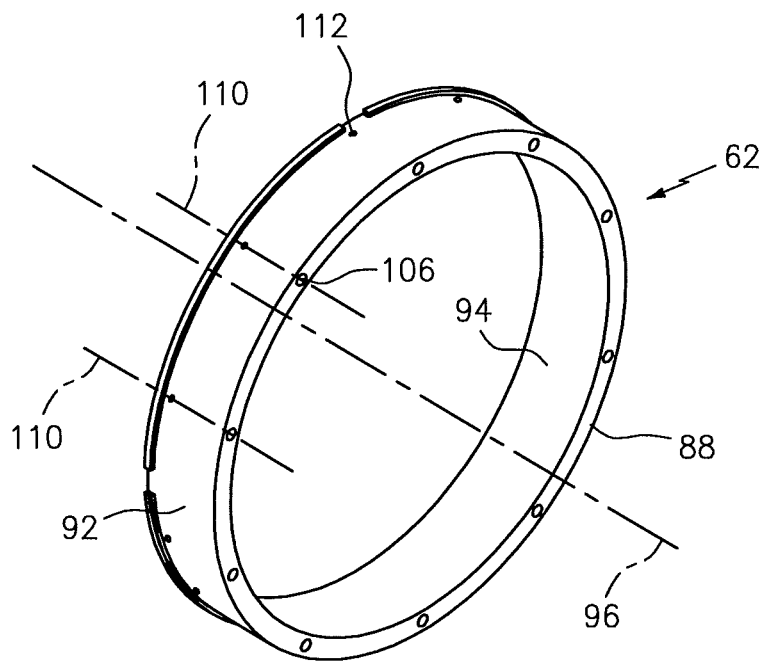
FIG. 3 is a perspective view of a damper ring embodiment.
Figure 4:
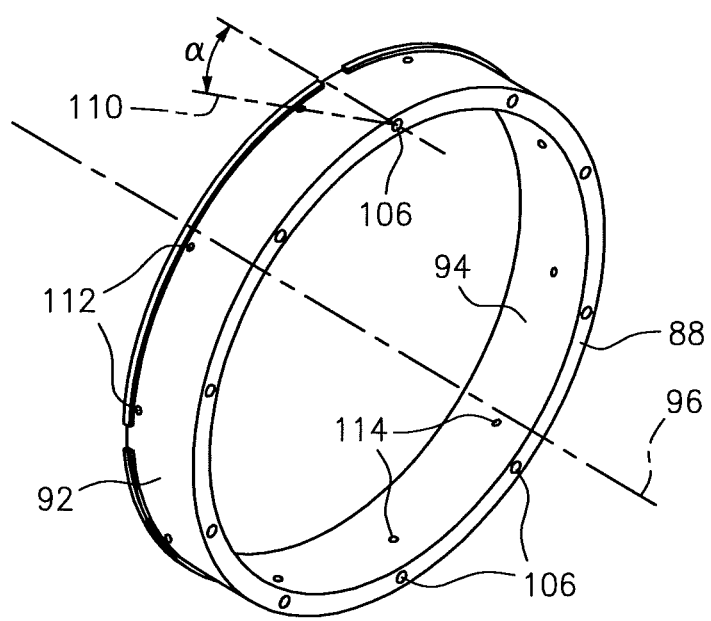
FIG. 4 is a perspective view of a damper ring embodiment.

In some embodiments, as can be seen in FIG. 3, the check valve passages 104 may extend substantially in an axial lengthwise direction; e.g., having a centerline 110 that extends in a direction that is parallel to the axial centerline 96 of the damper ring 62, and the two centerlines 96, 110 may be described as being co-planar. In other embodiments, as can be seen in FIGS. 4, 5A, and 5B one or more of the check valve passages 104 may have a centerline 110 that extends in a direction that is skewed relative to the centerline 96 of the damper ring 62; e.g., the check valve passage 104 extends along a centerline 110 that deviates circumferentially relative to the axial centerline 96 of the damper ring 62, and the centerlines are therefore not co-planar. The embodiment shown in FIGS. 4, 5A, and 5B shows the check valve passage 104 centerline 110 skewed at an angle of "a" to the axial centerline 96 of the damper ring 62. A check valve passage 104 having a centerline 110 that is skewed relative to the centerline 96 of the damper ring 62 may be configured to have a greater passage length (e.g., the distance between the open end 106 of the passage 104 and the terminal end 108 of the passage 104), than would be possible with a check valve passage 104 that extends substantially in an axial lengthwise direction. The greater passage length permits greater the use of longer length check valves.

Each check valve passage 104 is in fluid communication with the outer radial surface 92 of the damper ring 62 by an inlet aperture 112 that extends between the outer radial surface 92 and the check valve passage 104. Each check valve passage 104 is in fluid communication with the inner radial surface 94 of the damper ring 62 by an outlet aperture 114 that extends between the inner radial surface 94 and the check valve passage 104. As will be described below, each check valve passage 104 may include a plurality of different diameters. For example, the check valve passage 104 embodiment shown in FIG. 6 includes a first portion 116 having a diameter D1, a second portion 118 having a diameter D2, and a third portion 120 having a diameter D3, where D1>D2>D3. The present disclosure is not limited to this particular configuration.

The damper ring 62 includes a check valve 122 disposed in each check valve passage 104, typically between the inlet aperture 112 and the outlet aperture 114. The check valve 122 is configured to permit fluid flow through the check valve 122 in a first direction (e.g., as shown in FIG. 6), and to not permit fluid flow through the check valve 122 in a second direction, opposite to the first direction. The terms "to permit flow" and "to not permit flow" as used herein are not intended to be interpreted in absolute terms. For example, when a check valve 122 "permits" fluid flow in a first direction, the fluid flow may be subjected to some amount of head loss (e.g., frictional losses, minor losses, etc.) between the point of entry and the point of exit of the check valve, but in terms of magnitude, the amount of head loss is minimal when compared to the fluid flow through the check valve 122 in the first direction. In contrast, when a check valve 122 "does not permit" fluid flow in a second direction (opposite the first direction), the check valve prevents substantially and fluid flow from traveling through the check valve in the second direction. Some leakage through the check valve 122 may occur in the second direction, but the amount of leakage is minimal when compared to the fluid flow through the check valve 122 in the first direction. The check valve 122 is oriented within the check valve passage 104 such that fluid entering the check valve passage 104 via the inlet aperture 112 must pass through the check valve 122 before reaching the outlet aperture 114. The check valve 122 is also oriented within the check valve passage 104 such that fluid in the check valve passage 104 adjacent the outlet aperture 114 is prevented from passing entirely through the check valve 122 in a direction toward the inlet aperture 112 (other than an acceptable leakage as described above). Acceptable check valves 122 are configured to operate for the fluid pressures of the application at hand; i.e., configured to open when subjected to a fluid pressure at or above a predetermined minimum inlet fluid pressure and permit fluid flow through the valve with an acceptable amount of head loss, and to prevent fluid flow in the opposite direction up to a predetermined fluid pressure.

An example of an acceptable check valve is one that is fluid operated and does not require moving parts. The term "fluid-impedance check valve" as used herein describes a device having internal fluid paths between a first end (i.e., the inlet) and a second end (i.e., the exit) of the valve. The internal fluid paths permit fluid flow through the check valve between the inlet end toward the exit end. The same internal fluid paths substantially impede fluid flow attempting to pass through the check valve in the opposite direction, from the exit end toward the inlet end. For example, the internal fluid paths may be configured so orient opposing fluid flows, etc. The fluid-impedance check valve does not utilize moving mechanical components (e.g., a ball/ball seat, a deflectable reed, etc.) to directionally permit or impede fluid flow through the device, but rather uses the fluid flow itself to create the directional characteristics. In some embodiments, a fluid-impedance check valve may be formed integrally within a check valve passage 104. In other embodiments, a fluid-impedance check valve may be a self-contained unit that is disposed within a check valve passage 104.

In a gas turbine engine that is operating under "normal" conditions (e.g., in a constant RPM cruise mode), the fluid pressure within the fluid damping structure 64 is substantially consistent. In an imbalanced condition, however, a spool shaft section may be subject to cyclical, orbital motion (sometimes referred to as a "whirl"), which motion can create variations in fluid pressure within the damping chamber 84 (i.e., a dynamic pressure component). Generally speaking, an increase in the "whirl" causes a commensurate increase in the dynamic pressure component of the fluid within the damping chamber 84. Fluid pressure variations (both negative and positive) can be high in magnitude and short in duration. Our understanding is that fluid-impedance check valves perform well when subjected to such variations. In addition, it is our understanding that because fluid-impedance check valves of the type described herein do not include any mechanical moving parts, they also provide favorable durability when used in the present application.

Another example of an acceptable check valve is an axial type check valve such as those manufactured by The Lee Company of Westbrook, Conn., USA. The present disclosure is not, however, limited to any particular type of check valve 122.

The damper ring 62 further includes a fluid stop to prevent fluid exiting the first end surface 88 of the damper ring 62; e.g., a plug 124 or other structure disposed within each check valve passage 104. For example, a plug 124 may be disposed within the check valve passage 104 at a position between the first end surface 88 and the outlet aperture 114. In this position, the plug 124 does not impede fluid flow exiting the damper ring 62 through the outlet aperture 114, but does prevent fluid flow exiting the check valve passage 104 through the first end surface 88. The present disclosure is not limited to any particular type of fluid stop structure functionally able to prevent fluid flow exiting the check valve passage 104 through the first end surface 88; e.g., another example of a fluid stop is a seal plate attached to the first end surface 88. In the embodiment shown in FIG. 6, the check valve 122 is positioned in the second portion 118 of the check valve passage 104 against a shoulder at the intersection of the first and second portions 116, 118 of the check valve passage 104, and a fluid stop in the form of a plug 124 is press-fit within the first portion 116 of the check valve passage 104 at the intersection of the first and second portions 116, 118 of the check valve passage 104. The differences in portion diameters (D1, D2, D3) of the check valve passage 104 facilitate the positioning of the check valve 122 and the plug 124 within the check valve passage 104.

Figure 7:
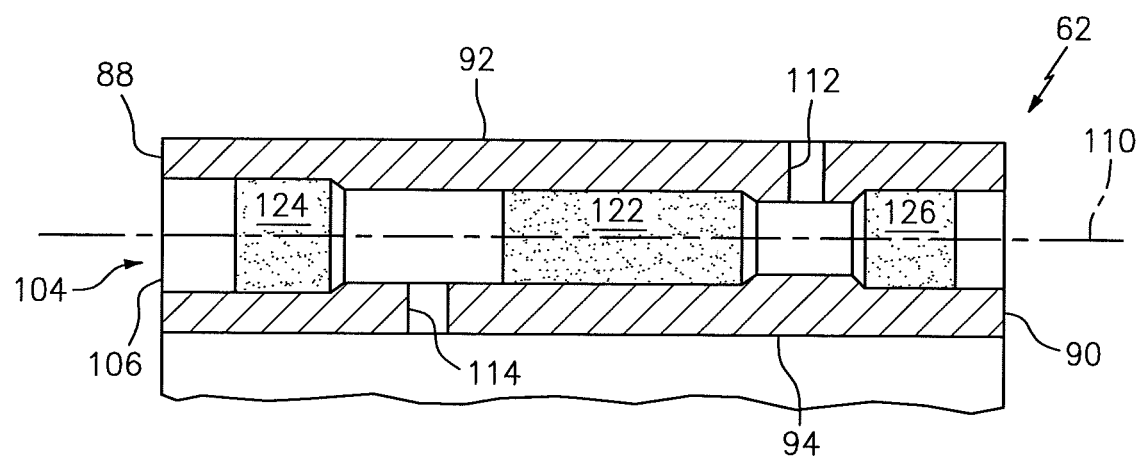
FIG. 7 is a diagrammatic sectional partial view of a damper ring embodiment.

As indicated above, in some embodiments, the check valve passages 104 may extend between the first and second end surfaces 88, 90 (e.g., see FIG. 7). Extending the check valve passages 104 between the first and second end surfaces 88, 90 may in some instances facilitate the manufacturing of the damper ring 62. In these embodiments, the damper ring 62 may include a second plug 126 or other structure (similar to that described above) configured to prevent fluid flow from exiting the damper ring 62 through the second end surface 90.

The damper ring 62 is configured to be disposed in communication with an annular supply cavity 128. Specifically, the damper ring 62 is configured such that the inlet apertures 112 are in fluid communication with the annular supply cavity 128. The annular supply cavity 128 may be a single circumferentially extending annular cavity, or it may include a plurality of annular sections with each section in fluid communication with a plurality of inlet apertures 112 and therefore check valve passages 104. For example, FIG. 2 shows the outer radial surface 92 of the damper ring 62 in contact with an annular support structure 130. A slot disposed in the annular support structure 130 forms the annular supply cavity 128. One or more passages 132 extending through the support structure 130 permit lubricant fluid to pass into the annular supply cavity 128, and thereafter into the check valve passages 104 of the damper ring 62 via the respective inlet apertures 112.

The above-described configurations of the damper ring that include one or more check valve passages 104 extending axially from the first end surface 88 inwardly toward the second end surface 90, between the inner and outer radial surfaces 94, 92, are particularly well suited to those embodiments that include fluid-impedance check valve. In some applications, fluid-impedance check valves may have a relatively long axial length (i.e., the distance from the inlet of the valve to the exit of the valve). Embodiments of the present damper ring have an axial length that is substantially longer than radial width of the body portion containing the check valve passage. As a result, the damper ring is able to accommodate longer length check valves than would be possible if the check valve was oriented radially, and therefore configurable to accept fluid-impedance check valves; i.e., a check-valve with no moving parts and increased durability.

Damping fluid for the fluid damping structure 64 may be provided from the main lubrication system 134 of the gas turbine engine 20. A variety of different gas turbine engine lubricant fluids are known in the public and will not therefore be discussed further herein. The present disclosure is not limited to use with any particular gas turbine engine lubricant fluid. Typical lubricant fluids used within a gas turbine engine 20 have a viscosity in the range of about 25 to 1.5 centistokes within the typical engine operating temperature range.

The main lubrication system 134 typically includes a main supply pump 136 (e.g., a positive displacement pump). In many gas turbine engines 20, the main supply pump 136 is configured to produce lubricant fluid output at parameters that vary as a function of the rotational speed of a rotor shaft directly or indirectly powering the main supply pump 136. For example, in many gas turbine engines 20, the main supply pump 136 may be mechanically driven off of the high speed spool that connects the high pressure compressor section and the high pressure turbine section. Because the main supply pump 136 is operatively linked to the high speed spool in these embodiments, the output parameters of the main supply pump 136 (e.g., lubricant fluid pressure and flow rate) vary as a function of the rotational speed of the high speed spool.

Under certain gas turbine engine operating conditions (e.g., when the engine 20 is operating in a cruise mode powering an aircraft), the high speed spool is typically rotating in the range of 13,000 to 23,000 revolutions per minute ("rpms"). Hence, a main supply pump 136 sized to meet the engine's lubrication requirements in that operational range would meet the lubricant fluid flow requirements of the engine 20, including those requirements associated with a fluid damping structure 64. However, gas turbine engines 20 also operate outside of the aforesaid operational range under certain conditions (e.g., start-up, idle, etc.). The fluid damping structures 64 must, therefore, be configured to operate under all anticipated engine operating conditions.

The present damper ring 62 is configured to supply an adequate lubricant fluid flow to the fluid damping structure 64 under all engine operating conditions, including those where the respective rotor shaft 68 is operating in an imbalanced condition. The utilization of a check valve 122 within each of the check valve passages 104 operates to maintain the aforesaid lubricant fluid distribution, flow, and pressure within the damping chamber 84 during an imbalance condition. Hence, the present disclosure includes a method of fluid damping a bearing compartment within a gas turbine engine 20 utilizing a fluid damping structure 64 as described above.

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A damper ring, comprising:
   an annular body that extends circumferentially around an axial centerline, the body defined by a first end surface, a second end surface, an outer radial surface, and an inner radial surface, wherein the outer radial surface and the inner radial surface extend axially from the first end surface toward the second end surface, wherein the annular body includes one or more check valve passages, each passage extending axially from an open end disposed at the first end surface inwardly toward the second end surface, and disposed between the inner radial surface and the outer radial surface, and wherein an inlet aperture extends between each check valve passage and the outer radial surface providing fluid communication there between, and wherein an outlet aperture extends between each check valve passage and the inner radial surface providing fluid communication there between;
   a fluid check valve disposed in each check valve passage, wherein the fluid check valve is configured to permit fluid flow in a first direction through the check valve passage from the inlet aperture to the outlet aperture and to substantially prevent fluid flow in a second direction opposite the first direction; and
   at least one fluid stop configured to prevent fluid exit from the open end of each check valve passage.

2. The damper ring of claim 1, wherein the one or more check valve passages includes at least ten check valve passages spaced substantially uniformly in a circumferential direction around the annular body.

3. The damper ring of claim 1 wherein each check valve passage extends from the open end to a terminal end disposed within the body.

4. The damper ring of claim 1, wherein each check valve passage includes a first portion having a diameter D1, a second portion having a diameter D2, and a third portion having a diameter D3, wherein D1>D2>D3, and wherein the inlet aperture extends between the third portion and the outer radial surface, and the outlet aperture extends between the second portion and the inner radial surface, and the check valve is disposed in the second portion.

5. The damper ring of claim 1, wherein the at least one fluid stop includes a plug disposed in each check valve passage.

6. The damper ring of claim 1, wherein at least one of the one or more check valve passages has a centerline that extends in a direction that is parallel to the axial centerline of the damper ring, and the check valve passage centerline and the axial centerline are co-planar.

7. The damper ring of claim 1, wherein at least one of the one or more check valve passages has a centerline that extends in a direction that is skewed by an angle $\alpha$ to the axial centerline of the damper ring, and the check valve passage centerline and the axial centerline are non-coplanar.

8. The damper ring of claim 1, wherein the fluid check valve is a fluid-impedance check valve with no moving components.

9. A gas turbine engine, comprising:
   at least one rotor shaft extending between a compressor section and a turbine section;
   at least one bearing compartment disposed to support the rotor shaft, the bearing compartment having at least one bearing and at least one fluid damping structure, wherein the fluid damping structure includes a damping chamber defined in part by a damper ring, the damper ring including:
     an annular body that extends circumferentially around an axial centerline, the body defined by a first end surface, a second end surface, an outer radial surface, and an inner radial surface, wherein the outer radial surface and the inner radial surface extend axially from the first end surface toward the second end surface, the annular body including one or more check valve passages, each passage extending axially from an open end disposed at the first end surface inwardly toward the second end surface, and disposed between the inner radial surface and the outer radial surface, and wherein an inlet aperture extends between each check valve passage and the outer radial surface providing fluid communication there between, and wherein an outlet aperture extends between each check valve passage and the inner radial surface providing fluid communication there between;
     a fluid check valve disposed in each check valve passage, wherein the fluid check valve is configured to permit fluid flow in a first direction through the check valve passage from the inlet aperture to the outlet aperture and to substantially prevent fluid flow in a second direction opposite the first direction; and
     at least one fluid stop configured to prevent fluid exit from the open end of each check valve passage; and
   a lubrication system that includes a main supply pump powered by the rotor shaft, the lubrication system configured to provide a flow of fluid lubricant to the damping chamber through the damper ring.

10. The gas turbine engine of claim 9, wherein the one or more check valve passages includes at least ten check valve passages spaced substantially uniformly in a circumferential direction around the annular body.

11. The gas turbine engine claim 10 wherein each check valve passage extends from the open end to a terminal end disposed within the body.

12. The gas turbine engine of claim 9, wherein the at least one fluid stop includes a plug disposed in each check valve passage.

13. The gas turbine engine of claim 9, wherein at least one of the one or more check valve passages has a centerline that extends in a direction that is parallel to the axial centerline of the damper ring, and the check valve passage centerline and the axial centerline are co-planar.

14. The gas turbine engine of claim 10, wherein at least one of the one or more check valve passages has a centerline that extends in a direction that is skewed by an angle $\alpha$ to the axial centerline of the damper ring, and the check valve passage centerline and the axial centerline are non-co-planar.

15. The gas turbine engine of claim 9, wherein the fluid check valve is a fluid-impedance check valve with no moving components.

16. A method of providing a damping fluid within a fluid damping structure disposed within a gas turbine engine, wherein the gas turbine engine includes a rotor shaft, the method comprising:

operating a main supply pump of the gas turbine engine to produce a damping fluid flow to a fluid damping structure, which fluid damping structure includes damper ring that defines a portion of a damping chamber, the damper ring including:

an annular body that extends circumferentially around an axial centerline, the body defined by a first end surface, a second end surface, an outer radial surface, and an inner radial surface, wherein the outer radial surface and the inner radial surface extend axially from the first end surface toward the second end surface, the annular body including one or more check valve passages, each passage extending axially from an open end disposed at the first end surface inwardly toward the second end surface, and disposed between the inner radial surface and the outer radial surface, and wherein an inlet aperture extends between each check valve passage and the outer radial surface providing fluid communication there between, and wherein an outlet aperture extends between each check valve passage and the inner radial surface providing fluid communication there between;

a fluid check valve disposed in each check valve passage, wherein the fluid check valve is configured to permit damping fluid flow in a first direction through the check valve passage from the inlet aperture to the outlet aperture and to substantially prevent damping fluid flow in a second direction opposite the first direction; and at least one fluid stop configured to prevent damping fluid exit from the open end of each check valve passage; and providing the damping fluid flow into the damping chamber through the plurality of check valve passages disposed within the damper ring and the check valve disposed in each respective check valve passage.

17. The method of claim 15 wherein each check valve passage extends from the open end to a terminal end disposed within the body.

18. The method of claim 16, wherein at least one of the one or more check valve passages has a centerline that extends in a direction that is parallel to the axial centerline of the damper ring, and the check valve passage centerline and the axial centerline are co-planar.

19. The method of claim 16, wherein at least one of the one or more check valve passages has a centerline that extends in a direction that is skewed by an angle α to the axial centerline of the damper ring, and the check valve passage centerline and the axial centerline are non-co-planar.

20. The method of claim 16, wherein the fluid check valve is a fluid-impedance check valve with no moving components.

\* \* \* \* \*